United States Patent Office 3,121,003
Patented Feb. 11, 1964

3,121,003
HERBICIDAL COMPOSITION AND METHOD
Louis P. Wilks and Sidney B. Richter, Chicago, Ill., assignors to Velsicol Chemical Corporation, Chicago, Ill., a corporation of Illinois
No Drawing. Filed Feb. 10, 1961, Ser. No. 88,308
11 Claims. (Cl. 71—2.3)

This invention relates to new compositions of matter. More specifically, this invention relates to new pesticidal chemical compounds and mixtures thereof which can be obtained by the isomerization of the chemical compound 4,5,6,7,8,8-hexachloro-3a,4,7,7a-tetrahydro-4,7-methanoindene, which hereinafter will be identified as compound A for brevity.

Compound A in its pure state is a white, crystalline compound which can be obtained by the equimolar addition of hexachlorocyclopentadiene and cyclopentadiene. Although compound A is a useful intermediate in a wide variety of chemical reactions, it has not shown significant activity in the control of noxious weeds such as crabgrass.

It has now been found that certain isomers of compound A which are the subject of this invention have unexpectedly shown surprisingly high toxicity to economically important weeds such as crabgrass, toward which the parent compound A shows no appreciable toxicity. This great difference in activities was unexpected, particularly in view of the fact that all the compounds of this invention are true chemical isomers; that is, they all have the same molecular formula ($C_{10}H_6Cl_6$) as parent compound A.

However, all the isomers in this invention are unique chemical compounds with distinct physical properties. Thus, compound A itself is a white crystalline solid which has a molecular formula $C_{10}H_6Cl_6$, and a melting point of 210° to 211° C. (under nitrogen). Compound A has an infrared absorption spectrum with strong bands at 13.5 and 14.8 microns, medium bands at 10.0, 11.0, 11.1, and 14.025 microns, and weak bands at 10.5, 12.025, 12.325, and 13.225 microns. In this spectrum, as well as those given for the other isomers below, the strong bands are those at less than 40% transmission, medium bands are those at 40–60% transmission, and weak bands are those at more than 60% transmission. One of the isomers of compound A which will be designated as alpha-A hereinafter for convenience, is a solid which has a molecular formula $C_{10}H_6Cl_6$, and a melting point, after repeated recrystallization, of 193.0° to 194.5° C. Alpha-A has an infrared absorption spectrum with strong bands at 10.925, 12.85, and 14.55 microns and medium bands at 10.1 and 13.825 microns. Alpha-A, like the parent compound A, has not been found to be toxic to crabgrass and is another illustration of the unpredictability of the activity of isomers of compound A. However, alpha-A is useful in that it undergoes isomerization to the herbicidally toxic gamma-A, described more fully below, when it is heated at temperatures of about 200° C. or above.

Another of the isomers of A, which will be designated as beta-A hereinafter, is a solid which has a molecular formula of $C_{10}H_6Cl_6$, and a melting point, after repeated recrystallization, of 146.3° to 147° C. Beta-A has an infrared absorption spectrum with strong bands at 10.4, 10.75, and 12.75 microns and medium bands at 10.075, 11.65, 13.7–13.8, and 14.4 microns. A third isomer of A which will be designated as gamma-A hereinafter, is a solid which has a molecular formula of $C_{10}H_6Cl_6$, and a melting point, after repeated recrystallization, of 102° to 103° C. Gamma A has an infrared absorption spectrum with strong bands at 11.65, 13.125, and 14.35 microns, medium bands at 10.19, 11.325, and 13.95 microns, and a weak band at 13.65 microns.

It will be readily apparent to one skilled in the art from the above data that while compound A, alpha-A, beta-A, and gamma-A all have the same molecular formula and are isomers of one another, each is a distinct chemical compound with definite physical properties which unequivocally distinguish it from the other isomers. The ultraviolet spectra and gas chromatographs of these compounds have also been found useful in identifying them.

The alpha-, beta-, and gamma-isomers of compound A can be obtained readily by the process which comprises heating compound A in the presence of catalysts, and if desired dissolved in suitable solvents. The yield of the desired isomeric products is greatly enhanced by the use of suitable catalysts. Generally, catalysts which are organic peroxy compounds are among the catalysts which are suitable for use in the process. Typical examples of some specific suitable catalysts are benzoyl peroxide, di-t-butylperoxide, t-butyl perbenzoate, t-butyl hydroperoxide, cumene hydroperoxide, diisopropylbenzene hydroperoxide, menthane hydroperoxide, acetyl peroxide, lauroyl peroxide, p-chlorobenzoyl peroxide, and combinations of such catalysts. The quantity of catalyst should be about 25% or less by weight based on the weight of compound A employed. It is preferred to use about 10% or less of catalyst by weight of compound A, and it is most preferred to use from about 0.5 to 5% of catalyst on the same weight basis.

It is often desirable to use suitable inert solvents to facilitate the process, although the process can be carried out satisfactorily by heating compound A with catalyst but without solvent. The type of solvent is not critical, but generally solvents of the halogenated hydrocarbon class are preferred. Typical examples of some specific suitable solvents are benzene, butyl acetate, heptane, amyl acetate, octane, ethyl acetate, nonane, nitrobenzene, nitroethane, acetic acid, diphenyl ether, n-octyl alcohol, isophorone, hexane, and such chlorinated hydrocarbons as chlorobenzene, o-dichlorobenzene, p - dichlorobenzene, 1,2,4-trichlorobenzene, carbon tetrachloride, trichloroethylene, 1,2-dichloroethane, chloroform, hexachlorobutadiene, perchlorethylene, and sym-tetrachloroethane.

The temperature at which the process can be carried out is not critical, since the exact temperature will depend largely on the boiling point of the particular solvent employed, if any. However, it is preferred to carry out the reaction at temperatures below about 200° C., and it is most preferred to carry out the reaction at temperatures between about 30° and about 160° C. Although the reaction is normally carried out at atmospheric pressure, sub- or superatmospheric pressures can also be used if desired.

The process is carried out until the desired degree of conversion of compound A to its isomers takes place. The course of this conversion can be followed readily by gas chromatography, infrared spectrum analysis, ultraviolet spectrum analysis or other techniques known to the art. Similarly, the product can be worked up by any of the standard techniques known to the art, such as distillation, crystallization, or chromatography.

Although the product obtained by the process will ordinarily be a composition which comprises preponderantly a mixture of the isomers of this invention, it is not necessary to separate the individual isomers, although this can be done conveniently by chromatography, for example, if desired. The crude mixture obtained by the process is useful as a pesticide without further purification or resolution of the individual isomers. However, the pure isomers can also be mixed after isolation and purification to give any desired proportions of isomers.

While various mixtures of compound A and its isomers can be used, such mixtures should contain at least 20% by weight of the active beta- and gamma-isomers or their mixtures, although, of course, higher percentages of these active mixtures can be employed. Theoretically, 100% of either of the active isomers can be employed alone, although practically or commercially they are produced in purities of less than 100% and in mixed form. Thus, typical commercial compositions can contain from about 15% to about 25% by weight of beta-A and from about 30% to about 60% by weight of gamma-A, with the balance compound A and the alpha-A isomer, in addition to other by-products normally arising in the isomerization process.

A number of tests were carried out to illustrate the pesticidal utility of the compositions of this invention. Many of these tests were carried out on crabgrass. Crabgrass is a term used to describe a group of summer annuals which cause extensive damage to lawns, turf, and other grassy areas. The crabgrass kills by taking moisture and nutrients from the soil and thus smothering and choking the desirable grasses. The grasses around each crabgrass plant are usually killed or seriously weakened. When the crabgrass dies, it leaves bare spots, liberally sprinkled with enough seeds to provide a serious infestation the next season. The two species of crabgrass which are the most widespread weed pests of lawns are *Digitaria ischaemum*, commonly known as smooth crabgrass, and *Digitaria sanguinalis*, usually known as common, large, hairy, tall, purple, fingergrass, turkeyfoot, crawfoot grass, and watergrass. At least fifteen other varieties of *Digitaria* species of crabgrass are known. Also generally classified with crabgrass are such weeds as goosegrass (*Eleusine indica*), broomsedge (*Andropogon virginicus*), pigeon grass or green bristle grass (*Setaria viridis*), yellow bristle grass (*Setaria lutescens*), watergrass (*Echinochloa crusgalli*), witchgrass (*Pumicum capillare*), cheatgrass or chess (*Bromus secalinus*), and dowy bromegrass (*Bromus testorum*).

In one series of tests, filter paper was dipped in acetone solutions of the test compounds at various concentrations. The paper was then dried, and small pieces were placed on the bottom of plastic dishes having a film of agar nutrient and a row of crabgrass seeds set apart from the treated filter paper. The seeds were allowed to germinate under controlled laboratory conditions, and the toxicity of the chemical compounds was determined on the basis of the primary root length of the germinated seedlings, short root lengths being indicative of high toxicity to crabgrass. The results of these tests are summarized in the following table:

| Test Chemical | Primary root lengths in mm. at concns. in p.p.m. of— | |
|---|---|---|
| | 200 | 300 |
| Beta-A | 9.0 | 9.5 |
| Gamma-A | 15.0 | 9.5 |
| 2 : 1 mixture gamma: beta-A | 5.0 | 4.0 |
| 1 : 1 mixture gamma: beta-A | 6.0 | 5.0 |
| Untreated Check | 23–24 | |

It will be obvious from the above data that beta- and gamma-A when used either alone or in mixtures are highly toxic to crabgrass. Indeed, as the above data also illustrate, beta-A and gamma-A frequently show synergistic activity on crabgrass when used in mixtures with one another. In comparable tests, neither A nor alpha-A showed any toxicity to crabgrass.

The following examples illustrate the manner in which the compositions of this invention can be prepared and used. All temperatures are in degrees centigrade.

EXAMPLE 1

*Preparation of 4,5,6,7,8,8-Hexachloro-3a,4,7,7a-Tetrahydro-4,7-Methanoindene (A)*

Hexachlorocyclopentadiene heated to 70°–80° C. was stirred while an equimolecular quantity of cyclopentadiene was added. A small amount of heptane was then added to maintain a slurry, and the mixture was stirred in a sealed vessel at 70°–80° with external cooling for about 20 minutes. The mixture was then stirred and heated at 150°–160° C. for about 40 minutes, cooled, and steam distilled. The residue was filtered and dried to give a nearly quantitative yield of crystalline product which was shown by infrared spectrum analysis to contain 96.4% of 4,5,6,7,8,8 - hexachloro - 3a,4,7,7a - tetrahydro - 4,7-methanoindene, having a melting point after recrystallization from methanol of 210°–211° C (under nitrogen).

EXAMPLE 2

*Isomerization of A and Separation of Isomers*

Compound A (50 parts by weight) prepared as described in Example 1 was dissolved in 195 parts by weight of carbon tetrachloride in a reaction vessel fitted with stirring apparatus, internal thermometer, and provision for reflux. A solution of 5 parts of benzoyl peroxide in 150 parts of carbon tetrachloride was then added at 80° C. over a period of 6 hours. The reaction mixture was then stirred and refluxed for 4 hours and cooled.

The solvent from about one liter of this reaction product was stripped for about 2 hours at 80°–100° C. to give 34.7 g. of an oily residue which was found by infrared spectrum analysis to contain about 22% alpha-A, 12% beta-A, 28% gamma-A, and only 8% unchanged A.

The oily residue was treated with 200 ml. of pentane, and the precipitated solid was filtered, recrystallized from acetone, and dried to give white crystals of alpha-A, M.P. 193–195°.

*Analysis.*—$C_{10}H_6Cl_6$: Theory—C, 35.44%; H, 1.79%; Cl, 62.78%. Found—C, 35.89%; H, 1.75%; Cl, 62.10%.

The pentane filtrate remaining after removal of the alpha-A was concentrated to a small volume and passed through a column of 1500 g. of Florex XXS fuller's earth with pentane as the eluant. Sixteen 250-ml. fractions were taken, followed by one with ether. The first 3 fractions were combined, and the pentane was stripped off to give an oily residue, which was taken up in more pentane, filtered, and chilled. The solid which separated was recrystallized from pentane to give white crystals of beta-A, M.P. 143–144.5°.

*Analysis.*—$C_{10}H_6Cl_6$: Theory—C, 35.44%; H, 1.79%; Cl, 62.78%. Found—C, 36.01%; H, 1.87%; Cl, 62.44%.

Removal of the solvent from fraction 7 of the Florex XXS eluant gave an oily residue, which was redissolved in pentane and passed through a column of 80 parts by weight of silica gel, pentane again being used as the eluant. The four 100-cc. fractions taken were found to contain the bulk of the unchanged A. The column was then eluated with ether, and the solvent was removed from the eluants to give an oily residue. The oil was dissolved in pentane and passed through a column of 80 parts by weight of Florex XXS with pentane eluant. The solvent was removed from fraction 4 of the 50-ml. fractions to give an oily residue which solidified. The solid was recrystallized from methanol to give white crystals of gamma-A, M.P. 97–98°.

*Analysis.*—$C_{10}H_6Cl_6$: Theory—C, 35.44%; H, 1.79%; Cl, 62.78%. Found—C, 35.87%; H, 1.69%; Cl, 62.26%.

Compositions of this invention for the control of crabgrass can be prepared by mixing one or more of the new compounds of this invention with inert carriers to provide formulations adapted for ready and efficient application with conventional applicator equipment to the site of the crabgrass infestation. For example, compositions or formulations according to this invention can be prepared in the form of solids or liquids. Solid compositions are preferably in the form of dusts or granular formulations. These are prepared to give homogeneous, free-flowing dusts, for example, by admixing the active compound or compounds of this invention with finely divided solids such as the talcs, natural clays, pyrophyllite, diatomaceous earth, fuller's earth, or flours such as walnut shell, wheat, redwood, soya bean, or cottonseed flours. Other inert solid carriers of the type ordinarily used in preparing pest control compositions in dusts or granular form can also be used.

Liquid compositions according to this invention can be prepared by admixing one or more of the new compounds of this invention with a suitable inert liquid diluent. In some cases the compounds are sufficiently soluble in the common pesticide solvents such as kerosene, xylene, fuel oil, the alkylated naphthalenes, and the like so that they can be used directly as solutions in these substances. However, the compositions of this invention can also contain a surface-active agent of the kind used in the art to enable the active compounds to be readily dispersed in water or other liquids to give sprays, which are a preferred method of applying the active compounds of this invention. The surface-active agents can be of the anionic, cationic or nonionic types. Typical examples of such surface-active agents are sodium stearate, sodium lauryl sulfate, sodium naphthalenesulfonate, sodium salt of ligninsulfonic acid, polyoxyethylene fatty alcohol ethers, polyglycol fatty acid esters, polyoxyethylene modified fatty acid esters, polyoxyethylenepolyol fatty acid esters, polyoxypropylene fatty alcohol ethers, quaternary ammonium salts such as lauryl dimethyl benzyl ammonium chloride, amine hydrochlorides such as laurylamine hydrochloride, alkylated aryl polyether alcohols such as the condensation product of diamylphenol with ethylene oxide, and the like. Mixtures of such agents can be used to combine or modify properties. The proportion of these agents will ordinarily vary from about 1% or less to about 15% by weight of the pesticidal compositions. Other pesticides as well as such substances as fertilizers, activators, adhesives, spreaders, and synergists can be added to these formulations if desired. The manner in which typical compositions according to this invention for crabgrass control can be prepared is illustrated in the following examples. All quantities given are in parts by weight.

EXAMPLE 3

*Preparation of an Emulsifiable Concentrate*

The following ingredients are blended thoroughly until a homogeneous liquid concentrate is obtained. This concentrate is mixed with water to give an aqueous dispersion containing the desired concentration of active compounds for use as a spray.

| | |
|---|---|
| Mixture containing 25% beta-A, 60% gamma-A, and 15% compound A | 50 |
| Mixture of equal parts polyoxyethylene nonylphenol and sodium lignin sulfonate | 5 |
| Xylene | 45 |

EXAMPLE 4

*Preparation of a Wettable Powder*

The following components are mixed intimately in conventional mixing or blending equipment and are then ground to a powder having an average particle size of less than about 50 microns. The finished powder is dispersed in water to give the desired concentration of active compounds.

| | |
|---|---|
| Mixture containing 10% beta-A, 10% gamma-A, 20% alpha-A, 10% compound A, and 50% other byproducts of isomerization process | 75.00 |
| Fuller's earth | 22.75 |
| Sodium lauryl sulfate | 2.00 |
| Methyl cellulose | .25 |

EXAMPLE 5

*Preparation of an Oil-Dispersible Powder*

The following components are blended and ground as described in the previous example to give a powder which can be dispersed in oil to form a spray containing the desired concentration of active compound.

| | |
|---|---|
| Mixture containing equal parts beta-A, and gamma-A | 70 |
| Condensation product of diamylphenol with ethylene oxide | 4 |
| Fuller's earth | 26 |

EXAMPLE 6

*Preparation of a Dust*

The following ingredients are mixed thoroughly and then ground to an average particle size of less than about 50 microns to give a dust suitable for application with conventional dusting equipment.

| | |
|---|---|
| Mixture containing 15% beta-A, 30% gamma-A, 20% alpha-A, 10% compound A and 25% other by-products of isomerization process | 20 |
| Talc | 80 |

EXAMPLE 7

*Preparation of a Granular Formulation*

A granular formulation is prepared by heating 20% of the crude, solvent-free product of Example 2 with 5% of heavy aromatic naphtha to form a viscous liquid, which is then sprayed onto 75% of granules of attapulgus clay, a hydrated aluminum magnesium silicate, having a mesh size of about 15–30 to 30–60 U.S. standard sieve.

We claim:

1. A compound selected from the group consisting of the beta- and gamma-isomers of 4,5,6,7,8,8-hexachloro-3a,4,7,7a-tetrahydro-4,7-methanoindene, said idene compound having a melting point of about 210°–211° C. under nitrogen; said beta-isomer having the molecular formula $C_{10}H_6Cl_6$, a melting range from about 143° to 147° C., and an infrared absorption spectrum having strong bands at 10.4, 10.75, and 12.75 microns and medium bands at 10.075, 11.65, 13.7–13.8, and 14.4 microns; said gamma-isomer having the molecular formula $C_{10}H_6Cl_6$, a melting range from about 97° to 103° C., and an infrared absorption spectrum having strong bands at 11.65, 13.125, and 14.35 microns, medium bands at 10.19, 11.325, and 13.95 microns, and a weak band at 13.65 microns.

2. The alpha-isomer of 4,5,6,7,8,8-hexachloro-3a,4,7,7a-tetrahydro-4,7-methanoindene, said indene compound having a melting point of about 210°–211° C. under nitrogen, said alpha-isomer being the compound having the molecular formula $C_{10}H_6Cl_6$, a melting range from about 193° to 195° C., and an infrared absorption spectrum having strong bands at 10.925, 12.85, and 14.55 microns and medium bands at 10.1 and 13.825 microns.

3. The beta-isomer of 4,5,6,7,8,8-hexachloro-3a,4,7,7a-tetrahydro-4,7-methanoindene, said indene compound having a melting point of about 210°–211° C. under nitrogen, said beta-isomer being the compound having the molecular formula $C_{10}H_6Cl_6$, a melting range from about 143° to 147° C., and an infrared absorption spectrum having strong bands at 10.4, 10.75, and 12.75 microns and medium bands at 10.075, 11.65, 13.7–13.8 and 14.4 microns.

4. The gamma-isomer of 4,5,6,7,8,8-hexachloro-3a,4,7,7a-tetrahydro-4,7-methanoindene, said indene compound having a melting point of about 210°–211° C. under nitrogen, said gamma-isomer being the compound having the molecular formula $C_{10}H_6Cl_6$, a melting range from about 97° to 103° C., and an infrared absorption spectrum having strong bands at 11.65, 13.125, and 14.35 microns, medium bands at 10.19, 11.325, and 13.95 microns, and a weak band at 13.65 microns.

5. A composition comprising at least 20% by weight of a compound selected from the group consisting of the beta- and gamma-isomers of 4,5,6,7,8,8-hexachloro-3a,4,7,7a - tetrahydro-4,7-methanoindene, said indene compound having a melting point of about 210–211° C. under nitrogen, and their mixtures; said beta-isomer having the molecular formula $C_{10}H_6Cl_6$, a melting range from about 143° to 147° C., and an infrared absorption spectrum having strong bands at 10.4, 10.75, and 12.75 microns and medium bands at 10.075, 11.65, 13.7–13.8, and 14.4 microns; said gamma-isomer having the molecular formula $C_{10}H_6Cl_6$, a melting range from about 97° to 103° C., and an infrared absorption spectrum having strong bands at 11.65, 13.125, and 14.35 microns, medium bands at 10.19, 11.325, and 13.95 microns, and a weak band at 13.65 microns.

6. A composition comprising 4,5,6,7,8,8-hexachloro-3a,4,7,7a - tetrahydro-4,7-methanoindene, said indene compound having a melting point of about 210°–211° C. under nitrogen, and its beta- and gamma-isomers, said beta- and gamma-isomers comprising at least 20% by weight of said composition; said beta-isomer having the molecular formula $C_{10}H_6Cl_6$, a melting range from about 143° to 147° C., and an infrared absorption spectrum having strong bands at 10.4, 10.75, and 12.75 microns and medium bands at 10.075, 11.65, 13.7–13.8, and 14.4 microns; said gamma-isomer having the molecular formula $C_{10}H_6Cl_6$, a melting range from about 97° to 103° C., and an infrared absorption spectrum having strong bands at 11.65, 13.125, and 14.35 microns, medium bands at 10.19, 11.325, and 13.95 microns, and a weak band at 13.65 microns.

7. A method of controlling crabgrass which comprises contacting said crabgrass with a composition comprising an inert carrier and as the essential active ingredient in a quantity which is toxic to said crabgrass, a compound selected from the group consisting of the beta- and gamma-isomers of 4,5,6,7,8,8-hexachloro-3a,4,7,7a-tetrahydro-4,7-methanoindene, said indene compound having a melting point of about 210°–211° C. under nitrogen; said beta-isomer having the molecular formula $C_{10}H_6Cl_6$, a melting range from about 143° to 147° C., and an infrared absorption spectrum having strong bands at 10.4, 10.75, and 12.75 microns and medium bands at 10.075, 11.65, 13.7–13.8, and 14.4 microns; said gamma-isomer having the molecular formula $C_{10}H_6Cl_6$, a melting range from about 97° to 103° C., and an infrared absorption spectrum having strong bands at 11.65, 13.125, and 14.35 microns, medium bands at 10.19, 11.325, and 13.95 microns, and a weak band at 13.65 microns.

8. A method of controlling crabgrass which comprises contacting said crabgrass with a composition comprising an inert carrier and as the essential active ingredient in a quantity which is toxic to said crabgrass, a composition comprising at least 20% by weight of a compound selected from the group consisting of the beta- and gamma-isomers of 4,5,6,7,8,8-hexachloro-3a,4,7,7a-tetrahydro-4,7-methanoindene, said indene compound having a melting point of about 210–211° C. under nitrogen, and their mixtures; said beta-isomer having the molecular formula $C_{10}H_6Cl_6$, a melting range from about 143° to 147° C., and an infrared absorption spectrum having strong bands at 10.4, 10.75, and 12.75 microns and medium bands at 10.075, 11.65, 13.7–13.8, and 14.4 microns; said gamma-isomer having the molecular formula $C_{10}H_6Cl_6$, a melting range from about 97° to 103° C., and an infrared absorption spectrum having strong bands at 11.65, 13.125, and 14.35 microns, medium bands at 10.19, 11,325, and 13.95 microns, and a weak band at 13.65 microns.

9. A composition for the control of crabgrass which comprises an inert carrier and as the essential active ingredient, in a quantity which is toxic to said crabgrass, a compound selected from the group consisting of the beta- and gamma-isomers of 4,5,6,7,8,8-hexachloro-3a,4,7,7a-tetrahydro - 4,7-methanoindene, said indene compound having a melting point of about 210°–211° C. under nitrogen; said beta-isomer having the molecular formula $C_{10}H_6Cl_6$, a melting range from about 143° to 147° C., and an infrared absorption spectrum having strong bands at 10.4, 10.75, and 12.75 microns and medium bands at 10.075, 11.65, 13.7–13.8, and 14.4 microns; said gamma-isomer having the molecular formula $C_{10}H_6Cl_6$, a melting range from about 97° to 103° C., and an infrared absorption spectrum having strong bands at 11.65, 13.125, and 14.35 microns, medium bands at 10.19, 11.325, and 13.95 microns, and a weak band at 13.65 microns.

10. A composition for the control of crabgrass which comprises an inert carrier and as the essential active ingredient, in a quantity which is toxic to said crabgrass, the composition of claim 5.

11. A composition for the control of crabgrass which comprises an inert carrier and as the essential active ingredient, in a quantity which is toxic to said crabgrass, the composition of claim 6.

References Cited in the file of this patent

March in "Jr. of Economic Entomology," vol. 45, 1952, pages 452–456.

Shenefelt in "Jr. of Economic Entomology," vol. 45, 1952, page 895.

Shostakovskii et al.: "Chemical Abstracts," vol. 52, 1958, columns 12818–12819.